United States Patent

[11] 3,594,538

| [72] | Inventor | Johannes Jacobus Broodman<br>Breskens, Netherlands |
|------|----------|---------------------------------------------------|
| [21] | Appl. No. | 742,637 |
| [22] | Filed | July 5, 1968 |
| [45] | Patented | July 20, 1971 |
| [73] | Assignee | N. V. Koninklijke Maatschappij "De Scheble"<br>Flushing, Netherlands |
| [32] | Priority | July 5, 1967 |
| [33] | | Netherlands |
| [31] | | 6,709,353 |

[54] METHOD OF MOLDED WELDING WITH CONSUMABLE NOZZLE
5 Claims, 10 Drawing Figs.

[52] U.S. Cl. .................................................. 219/73, 219/136
[51] Int. Cl. .................................................. B23k 9/18
[50] Field of Search .......................................... 219/73, 126, 130, 136, 137

[56] References Cited
UNITED STATES PATENTS

| 3,192,356 | 6/1965 | Shrubsall | 219/73 |
| 3,211,887 | 10/1965 | Cotterman | 219/73 |
| 3,291,955 | 12/1966 | Shrubsall | 219/73 |
| 3,325,619 | 6/1967 | Tanenbaum | 219/73 |
| 3,342,973 | 9/1967 | Smith | 219/73 |
| 3,358,115 | 12/1967 | Arnoldy | 219/73 |
| 3,466,421 | 9/1969 | Belfor | 219/73 |

*Primary Examiner*—Milton O. Hirshfield
*Assistant Examiner*—R. Skudy
*Attorneys*—Ralph E. Bucknam, Jesse D. Reingold, Robert R. Strack and Henry A. Marzullo, Jr.

ABSTRACT: A process of arc welding comprises providing a consumable nozzle disposed at the gap where a butt joint is to be made and disposing a separate electrical conductor wire at the gap to define a measuring probe. The measuring probe measures the arc voltage across the slag pool and the welding current is controlled by the aforesaid measured voltage to maintain the arc voltage or voltage across the slag pool substantially constant.

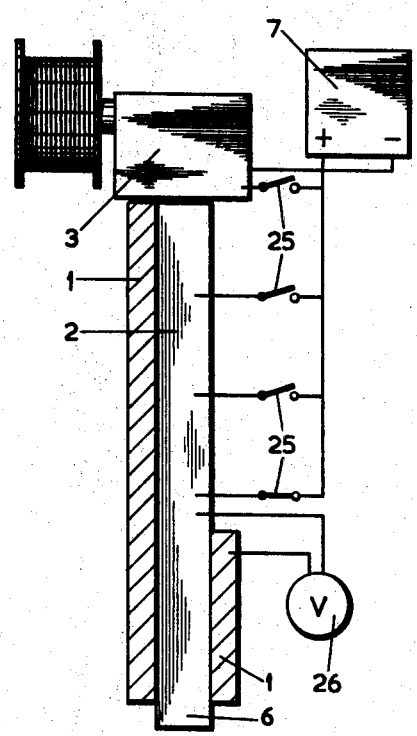
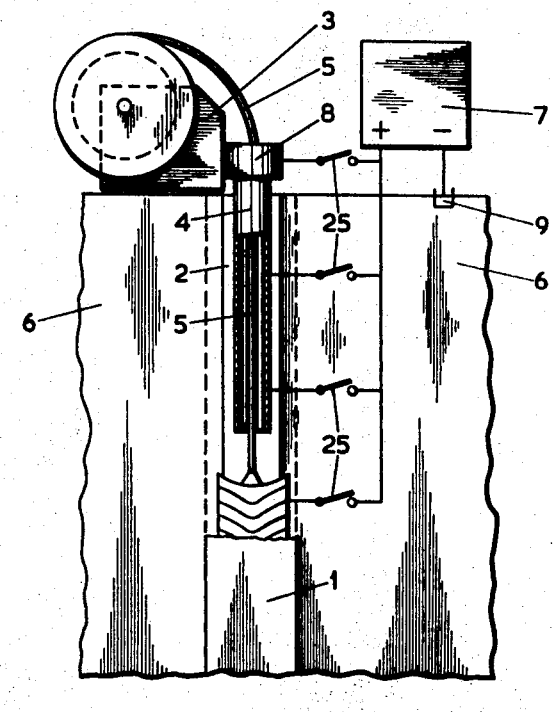
Fig. 1 PRIOR ART
Fig. 2 PRIOR ART
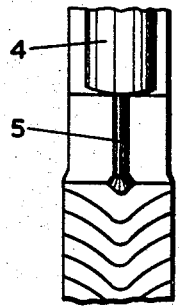
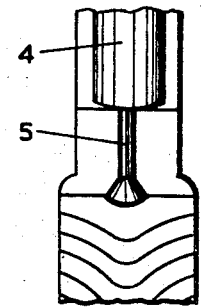
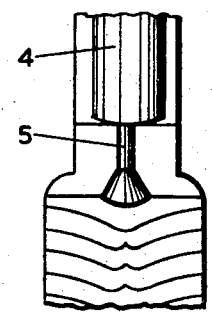
Fig. 3
Fig. 4
Fig. 5

METHOD OF MOLDED WELDING WITH CONSUMABLE NOZZLE

This invention relates to a method of molded welding by means of a current conducting consumable nozzle. Such a method is disclosed in "Electroslag Welding" by B. E. Paton, Welding Society Inc., New York, May 1962.

In this prior art welding process the welding equipment is not moved along the joint to be welded, but is maintained in a stationary position with respect to the workpiece. The welding wire is guided to the weld pool through a hollow current conductor or nozzle which projects vertically down the length of the seam to be welded. One terminal of the power source is connected to the hollow guide or nozzle, and the other terminal is connected to the workpiece. In this process of gas shielded arc welding or electroslag welding the arc or the slag bath respectively is produced between the welding wire and the workpiece portions below the lower end of the nozzle. Upon welding the nozzle melts together with the welding wire, and the molten material of the nozzle is added to the weld pool.

Since the arc voltage or the voltage across the slag bath very much effects the shape and quality of the weld it is preferred to weld with a constant welding wire supply and using a current source with flat voltage-current characteristic. In such welding current sources there is a voltage drop of about 1 to 2 Volt upon an increase of the welding current amounting to 100 Amperes. In the known arc welding process and electroslag welding process with consumable nozzle, the length of the joints are limited by the voltage drop across the length of the nozzle.

When welding longer joints according to this known process an inadmissible deviation of the arc voltage can occur caused by the electrical resistance of the nozzle, resulting in defects of the weld joint. Moreover this voltage difference quickly increases is a result of the increase of temperature of the nozzle at the start of the welding process, until a balanced situation is reached, after which the voltage difference slowly will decrease together with the melting away of the nozzle.

The prior welding process in particular is limited in case of welding thin plates, allowing a nozzle of small cross section only. A further disadvantage arises, if the welding powder, which upon welding long joints cannot be brought in the seam, is applied in the form of a lining on the nozzle, since this lining impedes the heat conduction. As a result of the high temperature the voltage across the nozzle can be very high.

Upon welding plates with a thickness of 19 mm., by means of a covered nozzle with a cross section of 12 mm. and a bore of 3 mm. and supplying a welding current of 550 Amperes, the voltage drop amounts to about 2.5 Volt per meter nozzle length. The nozzle temperature then rises to 600° C.

Since there will be defects in the weld in case the arc voltage is 2.5 Volts above or below the exact value, it results from the above, that the total length of thin plates (thickness of 10 mm.) which can be welded with the prior method, is about 1 meter and for heavier plates (35—40 mm.) about 3 meter.

However, this system is used, even if plates with greater length, for instance 10 to 20 meters, are welded together.

Upon welding such long seams, the dams of the molded consist of separate portions, for instance with a length of 0.5—3 meter. The arc voltage is measured at the top of the mold, whereas the power source will be controlled accordingly. The connection between the nozzle and the power source also can be made directly at the top of the mold. When a next higher dam is placed on top of the foregoing dam the connection with the power source will be made in the higher connecting point of the nozzle, above the new dam. The length of the chosen portions are so short, that it is not absolutely necessary to adjust the power source. However, above measures considerably reduce the advantages of the prior molded welding process with consumable nozzle.

Above disadvantages will be avoided by the method of the present invention, which is characterized in that during welding, the arc voltage or the voltage across the slag bath is constantly metered by means of a metering probe, which is in electrical contact with the molten end of the nozzle.

The measures of the present invention allow the welding of much greater plate lengths without correction. The mold can be applied over the total length of the seam to be welded. In the method according to the present invention the average welding voltage will be kept constant by automatically controlling the power source voltage.

In the preferred embodiment of the invention the metering probe consists of an electrically conducting wire, the molten end of which is in continuous metallic contact with the molten end of the nozzle. To assure a perfect electrical contact and to prevent the end of the metering probe to lose electrical contact with the molten end of the nozzle it is preferred to place the metering probe in a groove in the nozzle.

The arc voltage or in case of electroslag welding, the voltage across the slag bath is compared with a constant, adjustable reference voltage, the voltage difference being used to control an adjustable power source, such that the average voltage of the welding arc will remain mainly constant.

The control system preferably has such time constant, that the system does not react on transient fluctuations of the welding voltage. Transient variations in the welding current give rise to fluctuations of the voltage across the nozzle. The transient voltage variations across the nozzle introduce fluctuations in the arc voltage about the average value to be kept constant.

Therefore in another embodiment of the method according to the present invention use is made of a power source with inclining curve of the voltage-current characteristic in the working area. By a proper gradient of inclination of this characteristic it is possible almost completely to avoid the said transient variation in the arc voltage.

In case of a gas shielded arc welding process, for instance with $CO_2$ gas, an uncovered nozzle can be used. This nozzle can be insulated from the workpiece by means of a glass fiber mantle containing slag forming elements only, which do not prejudically affect the weld. Preferably use will be made of an insulated metering probe, pressed against the outer surface of the nozzle by the glass fiber mantle, such that the metering probe will be positioned between the glass fiber mantle and the nozzle. This will provide a good metallic contact between the metering probe and the nozzle near the weld.

In case of an electroslag welding process it is preferred to apply the welding powder for the slag bath as a cover on the consumable nozzle. In this case it is preferred to accommodate the metering probe in the welding powder covering, such that the covering isolates the metering probe from the nozzle and the nozzle from the workpiece.

The invention will now be illustrated by the following description with reference to the accompanying drawings, showing welding arrangements for performing the method of the present invention.

FIG. 1 is an elevational view, partially broken away and in section, of a prior art device used in a molded welding process employing a consumable nozzle.

FIG. 2 is another elevational view of the prior art device shown in FIG. 1 also partially broken away and in section.

FIG. 3 is a schematic representation of a consumable nozzle illustrating the effect of the welding voltage on the shape of the weld.

FIG. 4 is a schematic view similar to FIG. 3 illustrating the result of an arc voltage which is too low.

FIG. 5 is a schematic view similar to FIGS. 3 and 4 illustrating the result of an arc voltage which is too high.

Figure 6:
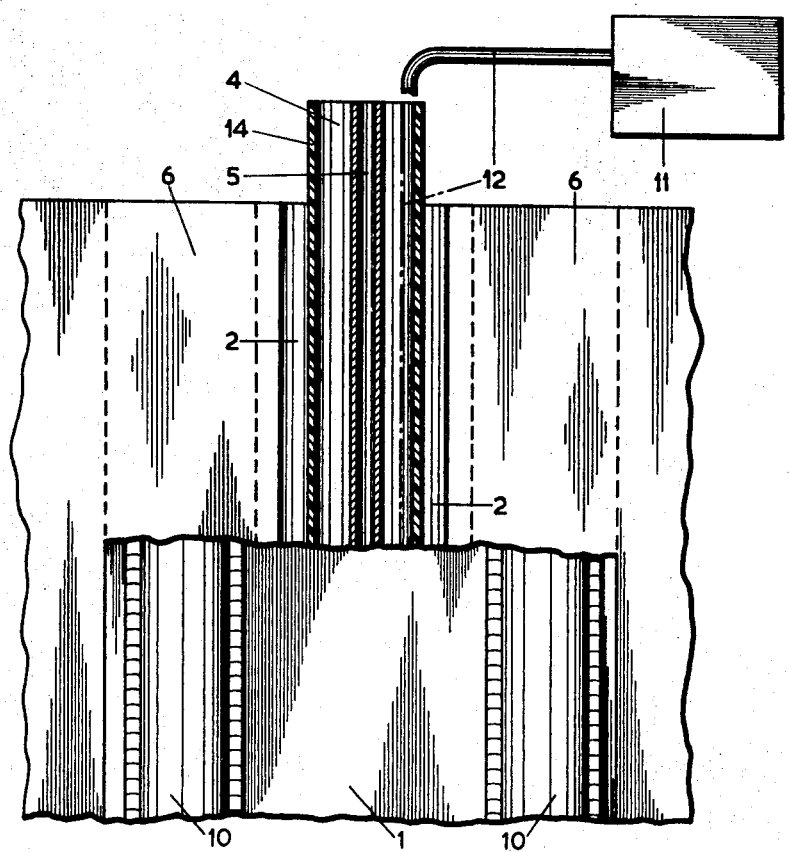
FIG. 6 is an elevational view, particularly broken away and in section, of an arrangement for molded welding with a consumable nozzle according to the present invention.

In the illustrated arrangement according to FIG. 1 two plates 6 are welded together. FIG. 1 shows a horizontal cross section through the weld, perpendicular to the plates 6 to be welded and FIG. 2 shows a horizontal cross section through the plane of the plates 6.

Water-cooled dams 1 form a mold for the seam 2 between the plates 6. The consumable nozzle 4 projects centrally down the length of the seam 2, the welding machine 3 being stationary at the top end of the seam to be welded. A terminal 8 connects the power source 7 with the consumable nozzle 4 and a terminal 9 connects the power source with the workpiece. The welding wire 5 is supplied down to the weld pool.

FIG. 1 further shows the prior way of controlling the arc voltage, in which each time one mold is filled and a new dam has been placed on top of the other a higher connecting point on the nozzle 4 with mutual distances of about 3 meters must be chosen by means of switches 25. The voltage across the nozzle and the melt for controlling the power source can be measured by means of the voltmeter 26.

FIGS. 3 to 5 show the effect of the welding voltage on the shape of the weld. FIG. 3 shows the result of a too low arc voltage and FIG. 4 the result of a too high arc voltage. FIG. 5 shows the situation in care of a correct arc voltage.

Figure 7:
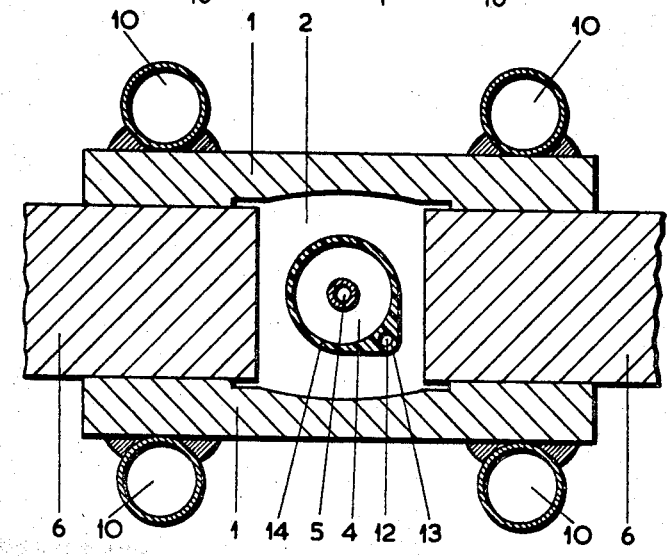
FIG. 7 is a representative horizontal sectional view of the arrangement shown in FIG. 6.

The above-described complicated way of connecting the welding current supply to the nozzle can be avoided by the method of the present invention. An arrangement for the welding process of the present invention is shown in FIGS. 6 and 7. FIG. 6 shows a partial cross section through the plane of the plates to be welded and FIG. 7 shows a cross section perpendicular to the plane of the plates to be welded and perpendicular to the seam.

Also in this case the plates 6 together with the dams 1 form the mold for the weld. In the present case however, the dams 1 without interruption stretch along the total length of the seam. The dams 1 are cooled by means of two cooling tubes 10, welded to the dams 1 over their total length.

The seam 2 now accommodates an insulated metering probe 12, separated from the nozzle 4 by means of a layer of insulating material 13. The metering probe 12 is pressed against the nozzle 4 by means of the insulating mantle 14, also insulating the nozzle 4 from plates 6 and dams 1.

The electrical contact between the ends of the metering probe and the nozzle is guaranteed by situating these ends as close together as possible. The metering probe melts by the heat from the nozzle, conducted through the nozzle, the nozzle itself, preheated by the welding current, melts under the influence of the radiation from the arc and the melt or the heat of the slag bath respectively.

The welding wire 5 is supplied to the melt through the hollow consumable nozzle 4 as was the case in the arrangement of FIG. 1.

The metering probe 12, leaving the seam at the top is electrically connected with the control device 11.

Thus it is also possible to weld below water level complete sections of ships, in which the seams have lengths of up to 20 meters. By means of the metering probe the arc voltage can be maintained at a mainly constant value (for instance 30 Volts), over the complete length of the seam without an interruption of the welding process.

Figure 8:
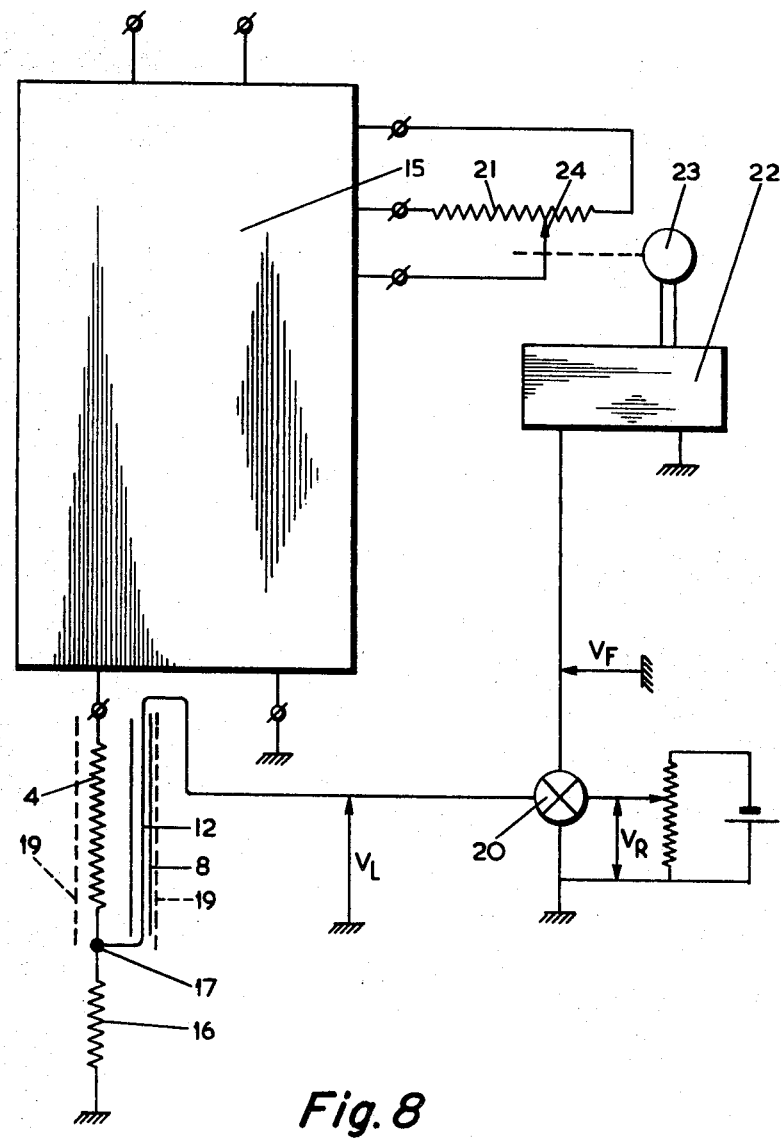
FIG. 8 is a circuit diagram showing the circuit used in connection with the present invention.

FIG. 8 shows a circuit diagram for the arrangement of the present invention.

Within the rectangular block 15 there is provided a usual three phase welding rectifier, connected through a transductor to the power transformer. The consumable nozzle is shown schematically only by means of the resistor 4.

The resistor 16 represents the welding arc, in case of a gas shielded welding process, or the slag bath, in case of an electroslag welding process. The average voltage across the resistor 16 (the welding arc) is metered by means of the metering probe 12. The contact 17 between the nozzle 4 and probe 12 is constituted in the molten material at the underside of the nozzle. This contact 17 moves upwards together with the melting of the probe. In the end situation the resistor 4 has disappeared.

The probe 12 is surrounded by a layer 8 of insulating material. The probe and nozzle are further surrounded by the insulating mantle 19.

The arc voltage (bath voltage in case of electroslag welding) $V_b$ is supplied to a comparator 20, comparing this voltage with a constant reference voltage $V_r$.

The difference between the voltages $V_b$ and $V_r$ are converted into an error voltage $V_f$, driving to movable contact 24 of potentiometer 21 to a predetermined chosen position, by means of a control system consisting of for instance an amplifier 22 and a servomotor 23. The transductor can be more or less saturated by varying the resistor 21, so that the desired voltage-current characteristic can be obtained. As a matter of course also a complete electronic control of the transductor is possible.

The characteristics of the transductor can be further improved by using an additional auxiliary winding and control voltage supplied thereto.

Figure 9:
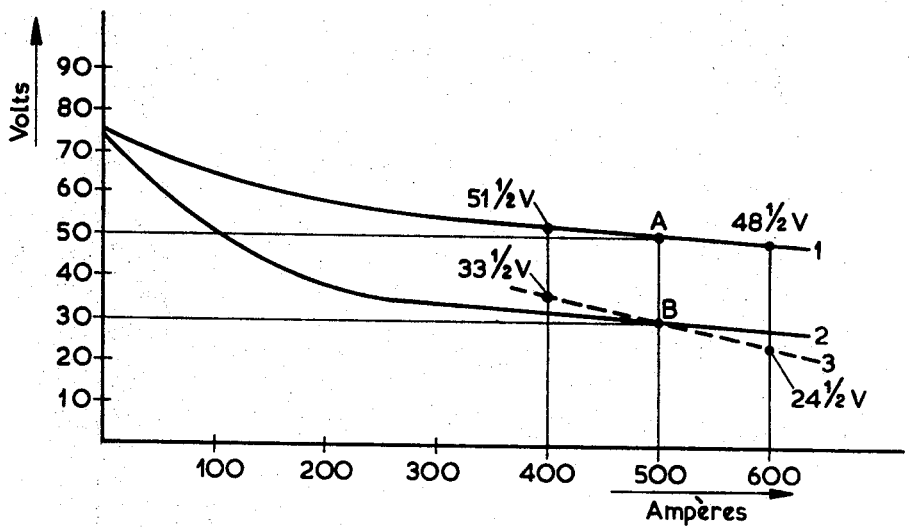
FIG. 9 shows curves representing the current-voltage characteristic of the power source used in the molded welding process of the invention.
Figure 10:
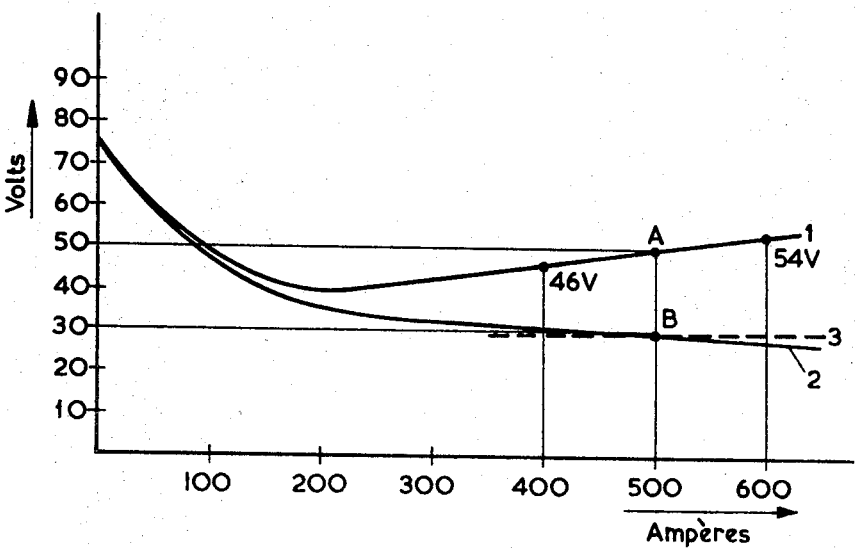
FIG. 10 shows other curves representing the current-voltage characteristic of the power source used in the molded welding process of the invention.

FIGS. 9 and 10 show voltage-current characteristics. The graphs show the welding current versus the arc voltage for the method of the present invention.

An usual condition for butt welding two plates is shown in point B of FIGS. 9 and 10, using an average welding current of 500 Amperes and an arc voltage of 30 Volts.

A voltage drop along the nozzle of 2 Volts per meter nozzle length results in a total voltage difference of 20 Volts by a total nozzle length and seam length of 10 meters. Therefore upon starting the welding process the voltage at the terminals of the welding machine should amount to 50 Volts (point A in FIGS. 9 and 10), whereas at the end of the welding process this voltage should be reduced to 30 Volts.

The graph of FIG. 9 shows declining voltage-current characteristics (slope 1.5 Volts per 100 Amperes current increase) and characteristics for so called constant voltage welding rectifiers. Curve 1 shows the relationship between current and voltage in the output terminals of the rectifier at the start of the welding process. The belonging curve 3, giving the relationship between current and voltage in the arc, has a more declining slope caused by the resistance of the nozzle. In the present example the slope of the curve for working point B is 5.5 Volts per 100 Amperes current variation. Curve 2 gives the situation at the end of the welding process, after which the nozzle is fused completely. In the output terminals of the current source all curves are passed through between curves 1 and 2 whereas at the arc the curves are passed through between curves 3 and 2.

Since in the welding method according to the present invention with constant welding wire supply the process proceeds more favorable according as the slope of the voltage-current characteristic reduces, the present method can be improved considerably by using in the working point of the power source an inclining voltage-current characteristic, as shown in FIG. 10.

In case the inclination of curve 1 through point A at the start of the welding process amounts to 4 Volts per 100 Amperes current variation, the corresponding curve 3 through the working point B at the welding arc will be horizontal, such that the arc voltage will be mainly kept constant upon variations of the welding current.

In the output terminals of the power source all curves will be passed through between curves 1 and 2, whereas at the end of the welding wire all curves are passed through between curves 3 and 2, so that transient fluctuations in the arc voltage substantially will be eliminated, providing a better control of the power source by the metering probe.

Although the present invention has been described above with reference to the shown arrangement, it is to be understood that changes and variations may be made without departing from the spirit and scope of the invention as defined in the appended claims.

I claim:

1. A process of arc welding for making butt joints, comprising providing a consumable nozzle disposed at the gap where the butt joint is to be made, welding said butt joint utilizating said consumable nozzle, disposing a separate electrical conductor wire at said gap substantially parallel to said consumable nozzle to define a measuring probe, allowing the lower end of said measuring probe to become molten by the heat at the lower end of said consumable nozzle, maintaining electrical contact between the end of said measuring probe and said molten lower end of said consumable nozzle, measuring the arc voltage or voltage across the slag pool by said measuring probe, and controlling the welding current source by the aforesaid measured voltage such that the arc voltage or voltage across the slag pool is maintained substantially constant.

2. A process according to claim 1 comprising providing a groove in said nozzle, and accommodating said measuring probe in said groove.

3. A process according to claim 1 further comprising providing an insulating material about said measuring probe, said measuring probe being separated from said nozzle by said insulating material.

4. A process according to claim 1 comprising providing an insulating material about said nozzle and mounting said measuring probe in said insulating material.

5. A process according to claim 1 comprising comparing the voltage measured by the measuring probe with a fixed measuring voltage, utilizating the difference between the measuring probe voltage and said reference voltage for controlling the welding current source so that the arc voltage or the voltage across the slag will remain substantially constant, providing a time delay in the control system so that the welding current source will not be affected by transient fluctuations of the arc voltage, the welding current source having a sloping slag voltage-current characterized in the working area of the characteristic.